(12) United States Patent
McSwiggan

(10) Patent No.: US 11,622,040 B2
(45) Date of Patent: *Apr. 4, 2023

(54) SYSTEM AND METHOD FOR PROJECTIVE CHANNEL HOPPING

(71) Applicant: Verint Americas Inc., Alpharetta, GA (US)

(72) Inventor: Stephen McSwiggan, Glasgow (GB)

(73) Assignee: VERINT AMERICAS INC, Alpharetta, GA (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/238,112

(22) Filed: Apr. 22, 2021

(65) Prior Publication Data

US 2021/0243302 A1    Aug. 5, 2021

Related U.S. Application Data

(63) Continuation of application No. 15/845,765, filed on Dec. 18, 2017, now Pat. No. 10,992,806.

(51) Int. Cl.
*H04M 3/523* (2006.01)
*H04M 3/51* (2006.01)
*G06Q 30/016* (2023.01)

(52) U.S. Cl.
CPC ........ *H04M 3/5141* (2013.01); *G06Q 30/016* (2013.01); *H04M 3/5166* (2013.01); *H04M 3/5191* (2013.01); *H04M 3/5238* (2013.01)

(58) Field of Classification Search
None
See application file for complete search history.

(56) References Cited

U.S. PATENT DOCUMENTS

| | | | |
|---|---|---|---|
| 9,191,508 B1* | 11/2015 | Mekonnen | H04M 3/4285 |
| 2005/0008141 A1* | 1/2005 | Kortum | H04M 3/523 379/266.06 |
| 2007/0198359 A1* | 8/2007 | Kannan | G06Q 30/0613 705/26.41 |
| 2011/0051918 A1 | 3/2011 | Fan | |
| 2011/0158398 A1* | 6/2011 | Kannan | H04M 3/5191 379/265.09 |
| 2013/0094647 A1* | 4/2013 | Mauro | H04M 3/5141 379/265.09 |

(Continued)

*Primary Examiner* — Nafiz E Hoque
(74) *Attorney, Agent, or Firm* — Christopher M. Scherer; Erin Ella Block; DeWitt LLP

(57) ABSTRACT

The present invention is a system and method for projective channel hopping within a customer engagement center (CEC) system. The CEC system receives a customer through a system entry point and receives, from the customer, a communication in a current customer service representative (CSR) channel in the CEC system. The CEC system assesses its ability to connect the customer with a CSR on the current CSR channel using a smart routing engine (SRE), which also assesses its current ability to connect the customer with a CSR on other equivalent CSR channels. Using the SRE, the CEC system compares its ability to connect the customer with a CSR on current and equivalent CSR channels to determine if the customer should remain on their current CSR channel or transfer to a new one. In the latter case, the CEC system offers the customer a chance to change channels or remain on their current channel.

18 Claims, 6 Drawing Sheets

(56) References Cited

U.S. PATENT DOCUMENTS

Figure 2A:
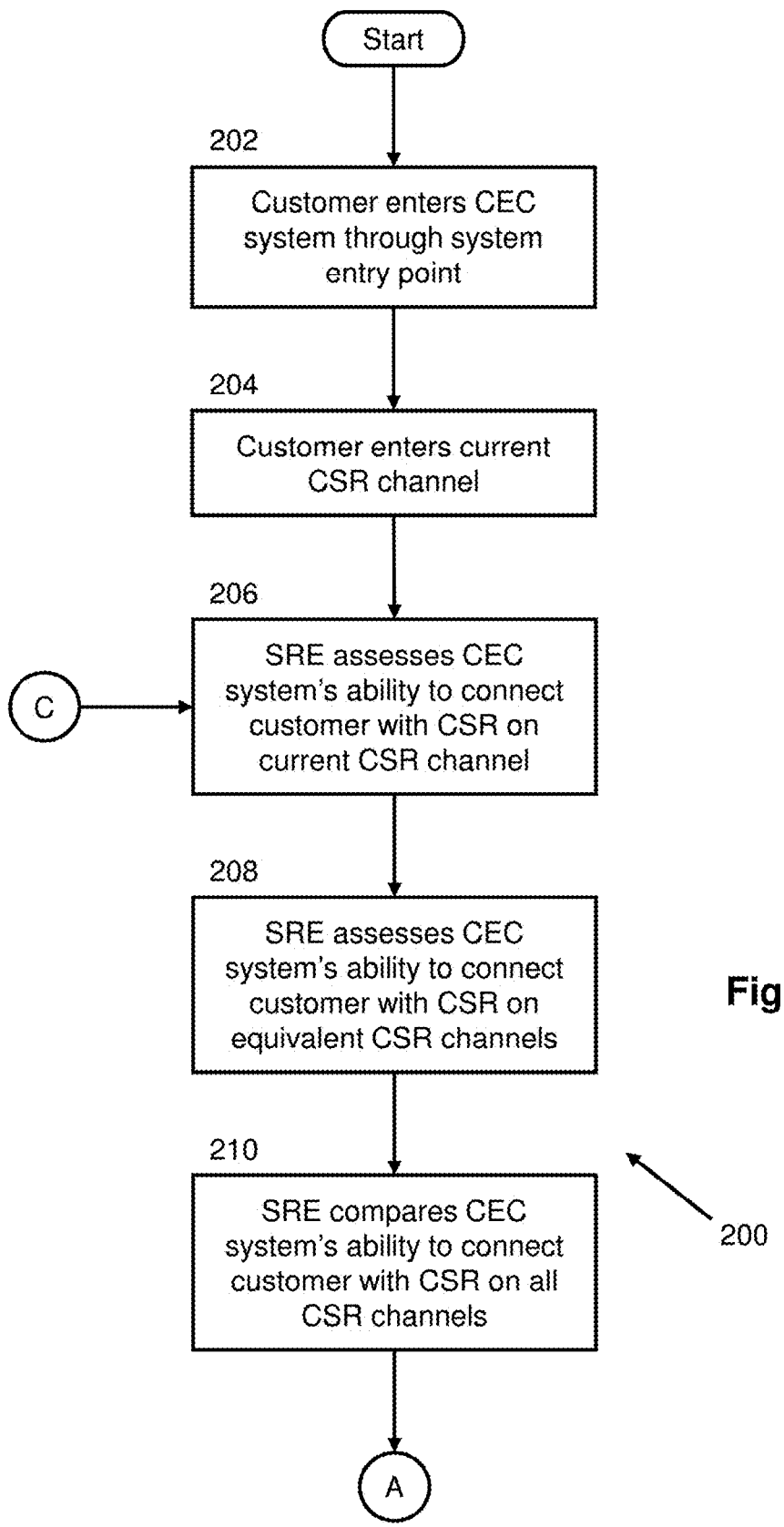
Figure 2B:
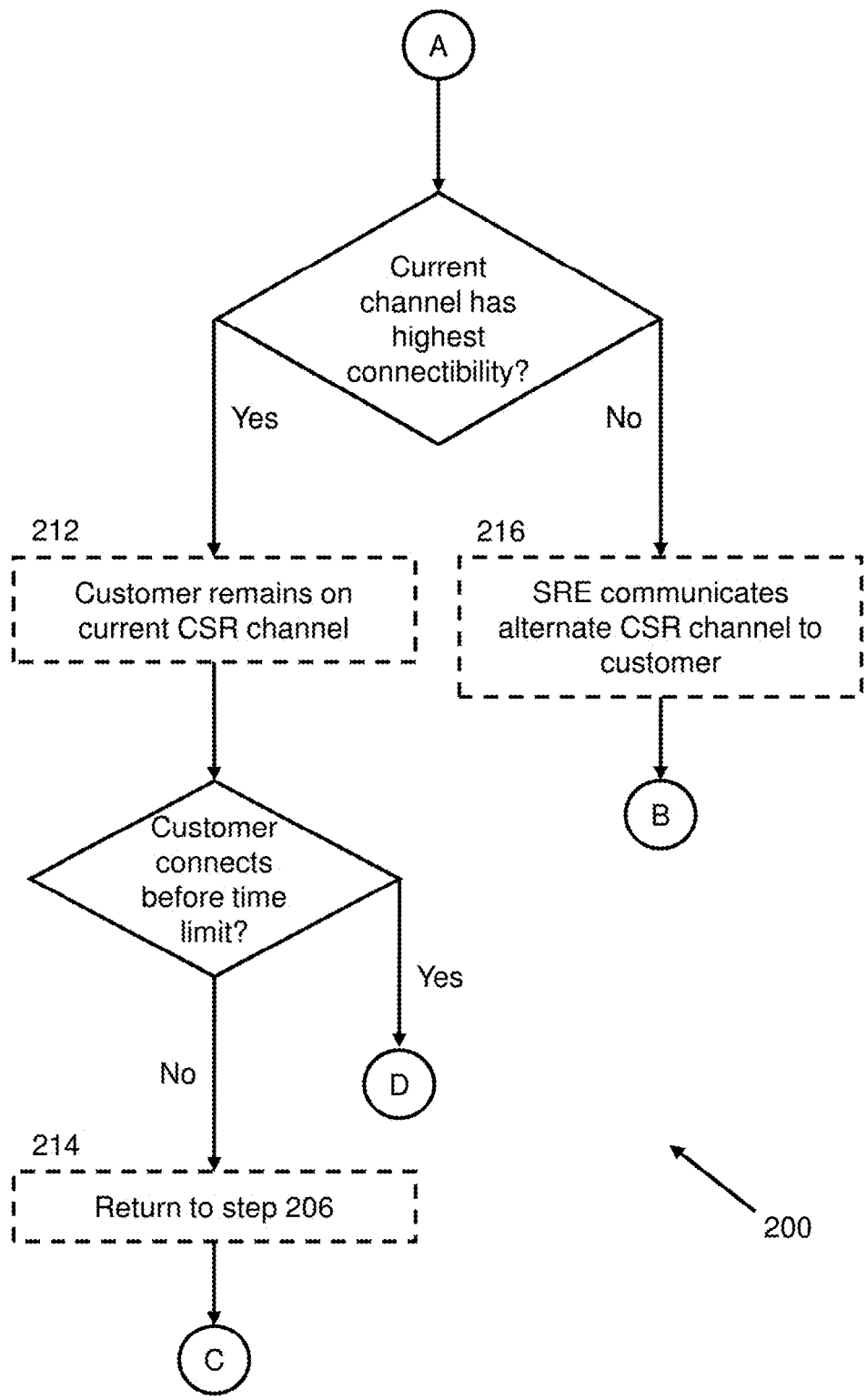
Figure 2C:
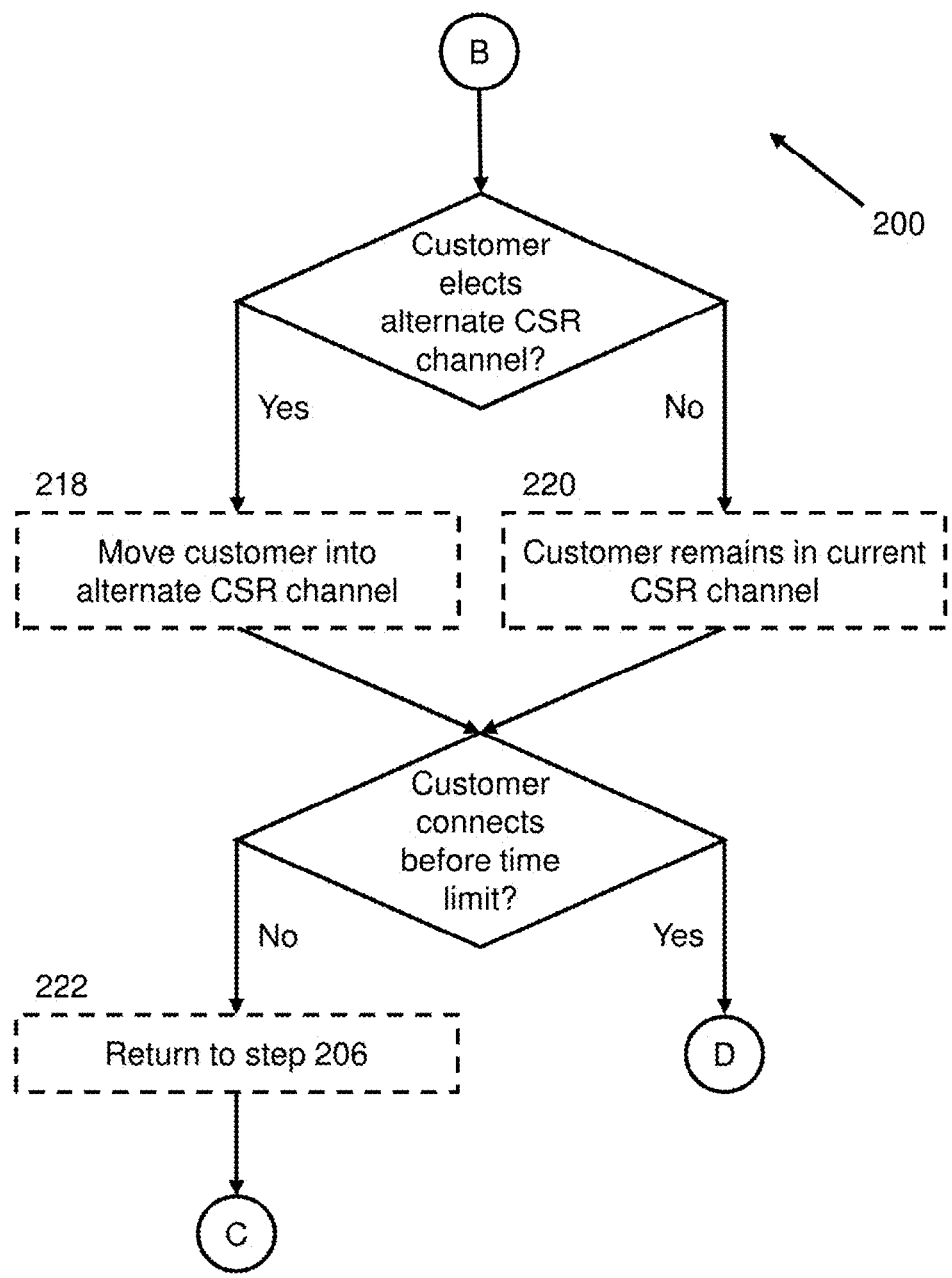
Figure 2D:
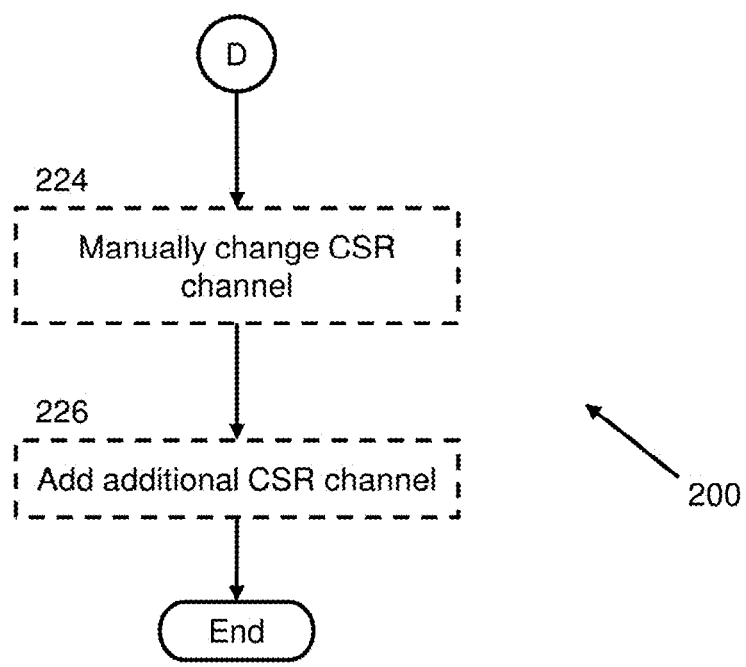

2014/0095397 A1* 4/2014 Phillips .............. G06Q 10/0639
                                                              705/304
2016/0344869 A1* 11/2016 Patel ....................... H04L 51/04
2018/0084111 A1* 3/2018 Pirat ....................... H04L 51/04

* cited by examiner

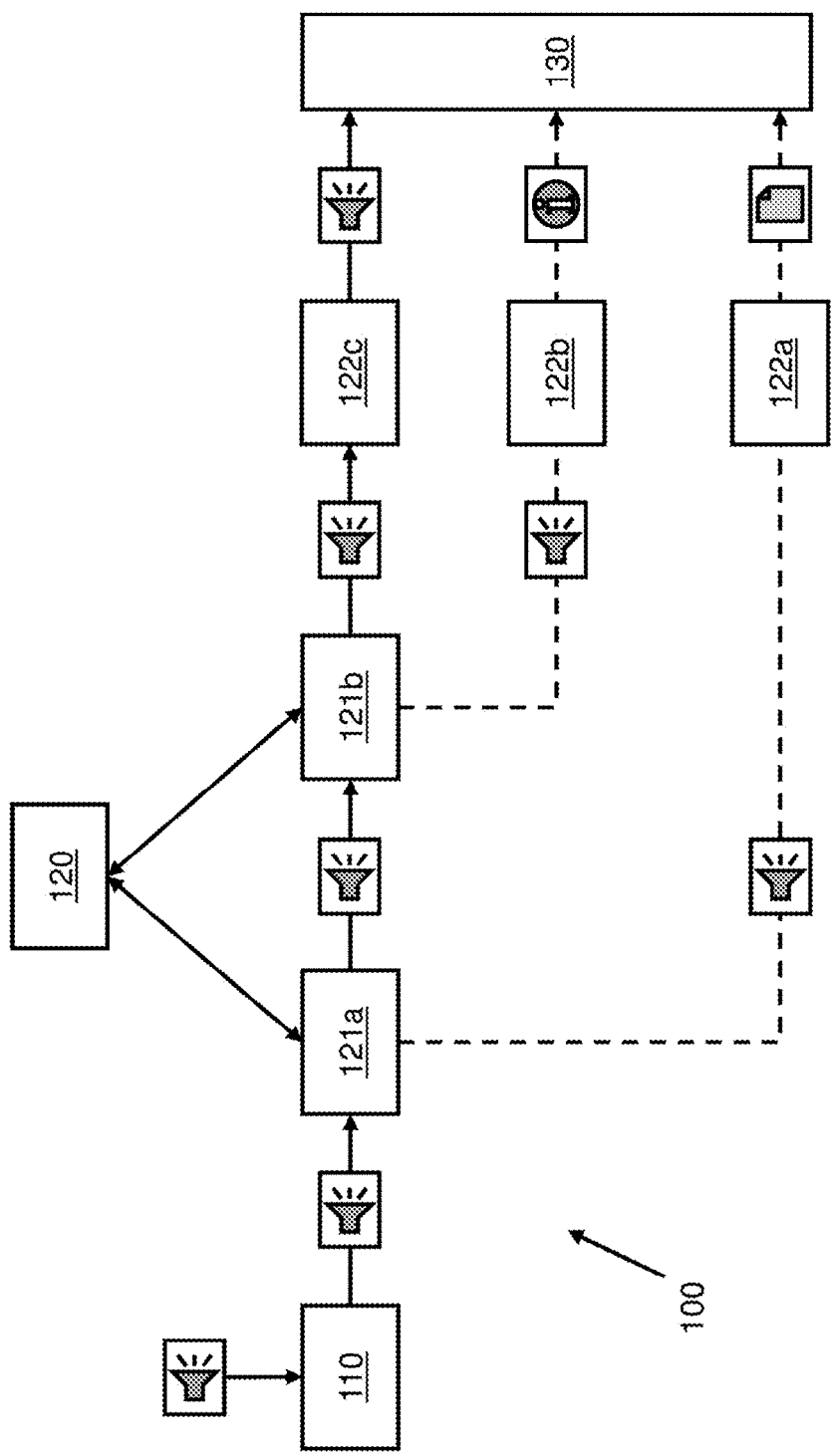

SYSTEM AND METHOD FOR PROJECTIVE CHANNEL HOPPING

CROSS-REFERENCE TO RELATED APPLICATIONS

The present application is a continuation of U.S. application Ser. No. 15/845,765, filed Dec. 18, 2017, the content of which is incorporated herein by reference in its entirety.

FIELD

The present disclosure is directed to a method for computer analysis, specifically a method of projective channel hopping.

BACKGROUND

In a modern high-volume customer engagement center (CEC), it is often the case that automated menus allow a customer to select a customer service representative (CSR) channel for their initial contact. Unfortunately, the CSR channel selected by a customer for their initial contact may not be the best CSR channel for a timely response due to differing levels of CSR availability across the CSR channels. For example, a telephone CSR channel may have a significant backlog of waiting customers, while an instant message CSR channel has immediate availability.

The initial CSR channel chosen by a customer is invariably based on the perceived convenience of using that CSR channel at that time. The customer may, however, have preferred to use a different channel if they knew in advance that they would receive a faster response from that channel. A customer initiating contact through a single CSR channel may not even know that other channels are available, or the ease of using them.

For example, a customer calling a telephone CSR channel listed on the back of a credit card may not know how to reach the instant message CSR channel, or that the telephone CSR channel is experiencing unusually high hold times. The customer may then wait on hold for half an hour instead of sending a message through the instant message CSR channel because they believe that the telephone CSR channel is the only way to resolve their issue.

There is an unmet need in the art for a system and method capable of projecting channel availability and providing a customer with the option of using a faster channel.

SUMMARY

An exemplary embodiment of the present application is a method for projective channel hopping. The method receives a customer into a customer engagement center (CEC) system through a system entry point and receiving, from the customer, a communication in a current customer service representative (CSR) channel in the CEC system. The CEC system assesses its ability to connect the customer with a CSR on the current CSR channel using a smart routing engine (SRE), which also assesses the CEC system's current ability to connect the customer with a CSR on other equivalent CSR channels. Using the SRE, the CEC system compares its ability to connect the customer with a CSR on current and equivalent CSR channels.

Another exemplary embodiment of the present application is a system for projective channel hopping. The system includes a processor and a non-transitory computer readable medium programmed with computer readable code that upon execution by the processor causes the processor to execute the above-mentioned method for projective channel hopping.

Another exemplary embodiment of the present application is a non-transitory computer readable medium programmed with computer readable code that upon execution by a processor causes the processor to execute the above-mentioned method for projective channel hopping.

The objects and advantages will appear more fully from the following detailed description made in conjunction with the accompanying drawings.

BRIEF DESCRIPTION OF THE DRAWING(S)

FIG. 1 depicts an exemplary embodiment of a CEC system for projective channel hopping.

FIGS. 2a, 2b, 2c, and 2d depict a flowchart of an exemplary embodiment of a method for projective channel hopping.

Figure 3:
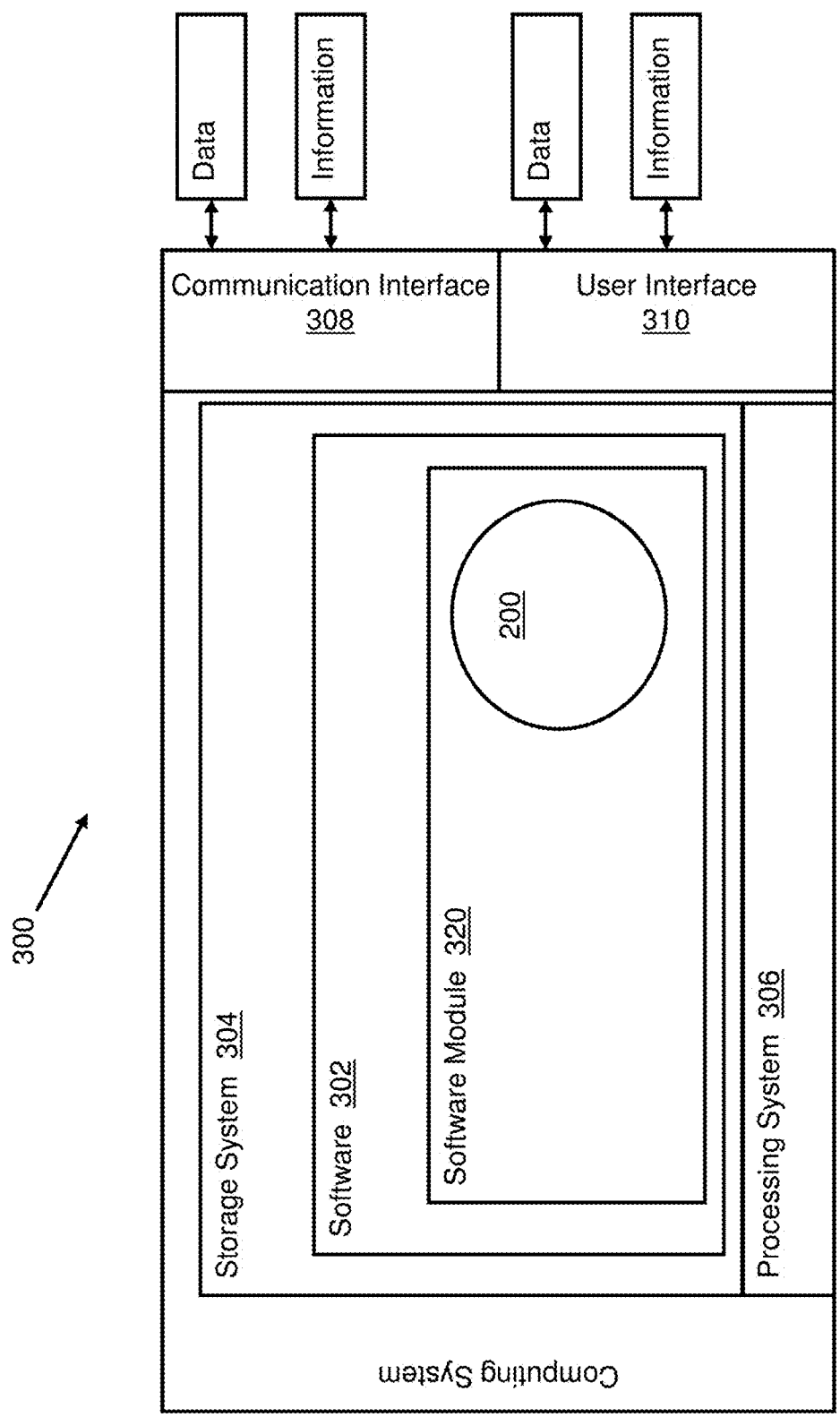

FIG. 3 depicts an exemplary embodiment of a system for projective channel hopping.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By predicting the flow of customer interactions and offering customer alternative channels for interaction, the CEC system can allow an organization to achieve several key benefits. First, the CEC system reduces wait times and backlogs by automatically allowing customers to access alternate channels of communication, instead of being funneled and bottlenecked through a single channel. Second, the CEC system informs customers of alternate channels of communication they may not have been aware of beforehand. Third, the CEC system reduces customer dissatisfaction with wait times by providing even the potential of alternate, faster channels of communication.

In embodiments, it is desirable for the system to project CSR channel availability. This permits the system to allow a customer to change to a more effective CSR channel. In an embodiment, it is desirable to periodically reevaluate the CSR channel availability projections to ensure that the customer remains on the most advantageous CSR channel. In yet another embodiment, it is desirable to substitute or add another CSR channel during the interaction between the CSR and the customer to accommodate multiple modes of communication.

FIG. 1 depicts an exemplary embodiment of CEC system 100 for projective channel hopping. A customer enters CEC system 100 through system entry point 110. The system entry point 110 may be, but is not limited to, an entry point for a telephone system, a video messaging system, an instant messaging system, a text messaging system, an interactive website, or an electronic mail system. A smart routing engine (SRE) 120, at different routing points 121, offers various CSR channels 122 for the customer to reach a CSR 130. The CSR channels 122 may be, but are not limited to, a telephone CSR channel 122, a video messaging CSR channel 122, a verbal messaging CSR channel 122, an instant messaging CSR channel 122, a text messaging CSR channel 122, an interactive website CSR channel 122, or an electronic mail CSR channel 122. It should be noted that certain CSR channels 122 may be subchannels of other CSR channels 122. By way of non-limiting example, an interactive website CSR channel 122 may also offer an instant messaging CSR channel 122 and an electronic mail CSR channel 122.

After the customer enters through system entry point 110, SRE 120 is configured to analyze the ability of CEC system 100 to transfer the customer to CSR 130 through the current CSR channel 122. If a different CSR channel 122 would be more efficient, the SRE 120 provides an interaction with the customer at routing point 121. The interaction may be audible or text-based. If the customer chooses to stay on the current CSR channel 122, SRE 120 periodically reevaluates the ability of CEC system 100 to transfer the customer to CSR 130 through the current CSR channel 122 at additional routing points 121.

By way of non-limiting example, SRE 120 may provide a verbal query at routing point 121*a* to a customer on a telephone CSR channel 122*c* if the customer would prefer to switch to an email CSR channel 122*a* due to long wait times on telephone CSR channel 122*c*. If the customer chooses to switch to email CSR channel 122*a*, SRE 120 switches them to that alternate CSR channel, which then becomes the current channel the customer may use to communicate with CSR 130. If the customer rejects the channel change and wait time continues to be lengthy, SRE 120 may make another verbal query at another routing point 121*b* if the customer would prefer to switch from telephone CSR channel 122*c*. This time, SRE 120 has determined that instant message CSR channel 122*b* is now the most efficient means of communications. If the customer chooses to switch to instant message CSR channel 122*b*, SRE 120 switches them to that alternate CSR channel, which the customer may then use to communicate with CSR 130. Otherwise, the customer remains on telephone CSR channel 122*c* until they reach CSR 130. While in the exemplary embodiment CEC system 100 offers two routing points 121*a* and 121*b*, and three CSR channels 122*a*, 122*b*, and 122*c*, more or fewer routing points 121 and CSR channels 122 could be used for different embodiments.

FIGS. 2*a*, 2*b*, 2*c*, and 2*d* depict a flowchart of an exemplary embodiment of method 200 for projective channel hopping.

In step 202, a new customer enters a CEC system through a system entry point. Entry may be through, but is not limited to, telephone call-in or initiation of an instant messaging or text messaging session.

In step 204, the customer enters a current CSR channel. This channel may be selected by the customer, dictated by the system entry point, or selected by the CEC system based on customer responses to system queries, such as, but not limited to, responses to queries from an interactive voice response (IVR) system or a text-based query or series of queries.

In step 206, the SRE assesses the CEC system's ability to connect the customer with a CSR on the current CSR channel. The assessment may be based on information including current and scheduled future CSR availability, available CSR skills, average handling time, projected or historical communication workload data, and the subject matter and nature of the communication requested by the customer. Utilizing scheduled future CSR availability prevents the SRE from incorrectly evaluating a CSR channel that is about to lose or receive a number of CSRs. Utilizing available CSR skills ensures that the SRE does not incorrectly assign matters to a CSR channel with CSRs that do not possess an appropriate skill base for the subject matter and nature of the communication.

In step 208, the SRE assesses the CEC system's current ability to connect the customer with a CSR on other equivalent CSR channels. The assessment may be based on information including current and scheduled future CSR availability, available CSR skills, average handling time, projected or historical communication workload data, and the subject matter and nature of the communication requested by the customer.

In step 210, the SRE compares the CEC system's ability to connect the customer with a CSR on all equivalent CSR channels based on the results of the assessments of steps 206 and 208.

In optional step 212, if the current CSR channel has the highest ability to connect the customer with a CSR, then the customer remains on the current CSR channel.

In optional step 214, if the customer does not connect with a CSR after a predetermined time on the current channel, the system returns to steps 206 through 210. The predetermined time may be set by a CSR, a system administrator, or the customer, or calculated by the CEC system based on wait times, backlog, or any other information. The predetermined time may be updated based on changes in the CEC system or user input.

In optional step 216, if the current CSR channel does not have the highest ability to connect the customer with a CSR, the SRE reaches a routing point and communicates the alternate CSR channel to the customer.

In optional step 218, the customer elects to be routed to the alternate CSR channel and the system moves the customer into the alternate CSR channel for communication with the CSR. At this point the alternate CSR channel becomes the current CSR channel.

In optional step 220, the customer elects to remain on the current CSR channel and wait to be connected with the CSR.

In optional step 222, the system returns to step 206 through 210 if the customer does not connect with a CSR after a predetermined time. The predetermined time may be set by a CSR, a system administrator, or the customer, or calculated by the CEC system based on wait times, backlog, or any other information. The predetermined time may be updated based on changes in the CEC system or user input.

In optional step 224, either the customer or the CSR can initiate a manual change of the CSR channel. By way of non-limiting example, a customer may wish to provide a CSR with a photograph of a damaged item to assist them with a technical issue, switch to an electronic mail CSR channel for the interaction, send the picture, and then switch back to the original telephone CSR channel.

In optional step 226, either the customer or the CSR can add an additional CSR channel to the interaction. By way of non-limiting example, a CSR may wish to provide a customer with a confirmation number, and so add a text messaging CSR channel to the interaction, then send the confirmation number through the text messaging CSR channel.

FIG. 3 depicts an exemplary embodiment of system 300 for projective channel hopping.

The system 300 is generally a computing system that includes a processing system 306, a storage system 304, software 302, a communication interface 308, and a user interface 310. The processing system 306 loads and executes software 302 from the storage system 304, including a software module 320. When executed by computing system 300, software module 320 directs the processing system 306 to operate as described in herein in further detail in accordance with the method 200.

The computing system 300 includes a software module 320 for performing the function of CEC system 100. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. The processing system 306 can be implemented within a single processing device but can also be distributed across multiple processing devices or sub-systems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. The storage system 304 can be implemented as a single storage device but may also be implemented across multiple storage devices or sub-systems. The storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include verbal or textual communications, such as, but not limited to, queries to or from a customer, responses to such queries, and/or details about a CSR channel, a request, a work order, or another set of data that will necessitate an interaction between a customer and the CSR and/or system 300. In embodiments, the communication interface 308 also operates to send and/or receive information, such as, but not limited to, information to/from other systems to which computing system 300 is communicatively connected, and to receive and process information as described in greater detail above. Such information can include current and scheduled future CSR availability, average handling time, available CSR skills, and the subject matter and nature of the communication requested by the customer.

The user interface 310 can include a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display documents or another interface further associated with embodiments of the system and method as disclosed herein. Speakers, electronic transmitters, printers, haptic devices and other types of output devices may also be included in the user interface 310. A CSR or other staff can communicate with computing system 300 through the user interface 310 in order to view documents, enter or receive data or information, enter information, manage an interaction, or any number of other tasks the CSR or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for projective channel hopping, comprising:
   receiving a communication in a current customer service representative (CSR) channel;
   assessing an ability to connect the communication with a CSR on all eligible CSR channels;
   determining one eligible CSR channel out of all eligible CSR channels with a highest ability to connect the communication with a CSR;
   automatedly retaining the communication on the current CSR channel if it is determined the current CSR channel has the highest ability to connect the communication with a CSR;
   establishing after a predetermined amount of time, that the communication has not been automatedly connected to the CSR;
   performing the above assessing and determining again after the predetermined amount of time; and
   automatedly retaining the communication on the current CSR channel if it is determined the current CSR channel still has the highest ability to connect the communication with a CSR.

2. The method of claim 1, wherein the communication is received from a customer through a system entry point for a customer engagement center (CEC).

3. The method of claim 1, wherein determining the CSR channel with the highest ability to connect the communication with the CSR includes accessing a current ability to connect the communication on the current CSR channel.

4. The method of claim 3, wherein determining the CSR channel with the highest ability to connect the communication with the CSR includes accessing a current ability to connect the communication to at least one other equivalent CSR channel.

5. The method of claim 4, wherein determining the CSR channel with the highest ability to connect the communication with the CSR further includes comparing the current ability to connect the communication on the current CSR channel to the ability to connect the communication on the at least one other equivalent CSR channel and making the determination based on the comparing.

6. The method of claim 1, wherein the predetermined amount of time is calculated based on wait times or backlog.

7. A system for projective channel hopping, comprising:
a processor; and
a non-transitory computer readable medium programmed with computer readable code that upon execution by the processor causes the processor to:
receive a communication in a current customer service representative (CSR) channel;
assess an ability to connect the communication with a CSR on all eligible CSR channels;
determine one of eligible CSR channel out of all eligible CSR channels with a highest ability to connect the communication with a CSR;
automatedly retain the communication on the current CSR channel if it is determined the current CSR channel has the highest ability to connect the communication with a CSR;
establish, after a predetermined amount of time, that the communication has not been automatedly connected to the CSR;
execute the above assessing and determination processes again after the predetermined amount of time; and
automatedly retain the communication on the current CSR channel if it is determined the current CSR channel still has the highest ability to connect the communication with a CSR.

8. The system of claim 7, wherein the communication is received from a customer through a system entry point for a customer engagement center (CEC).

9. The system of claim 7, wherein the determination of the CSR channel with the highest ability to connect the communication with the CSR includes causing the processor to access a current ability to connect the communication on the current CSR channel.

10. The system of claim 9, wherein the determination of the CSR channel with the highest ability to connect the communication with the CSR includes causing the processor to access current ability to connect the communication to at least one other equivalent CSR channel.

11. The system of claim 10, wherein the determination of the CSR channel with the highest ability to connect the communication with the CSR further includes causing the processor to compare the current ability to connect the communication on the current CSR channel to the ability to connect the communication on the at least one other equivalent CSR channel and making the determination based on the comparison.

12. The system of claim 7, wherein the predetermined amount of time is calculated based on wait times or backlog.

13. A non-transitory computer readable medium programmed with computer readable code that upon execution by a processor causes the processor to execute a method for projective channel hopping, comprising:
receiving a communication in a current customer service representative (CSR) channel;
assessing an ability to connect the communication with a CSR on all eligible CSR channels;
determining one eligible CSR channel out of all eligible CSR channels with a highest ability to connect the communication with a CSR;
automatedly retaining the communication on the current CSR channel if it is determined the current CSR channel has the highest ability to connect the communication with a CSR;
establishing after a predetermined amount of time, that the communication has not been automatedly connected to the CSR;
performing the above assessing and determining again after the predetermined amount of time; and
automatedly retaining the communication on the current CSR channel if it is determined the current CSR channel still has the highest ability to connect the communication with a CSR.

14. The non-transitory computer readable medium of claim 13, wherein the communication is received from a customer through a system entry point for a customer engagement center (CEC).

15. The non-transitory computer readable medium of claim 13, wherein determining the CSR channel with the highest ability to connect the communication with the CSR includes accessing a current ability to connect the communication on the current CSR channel.

16. The non-transitory computer readable medium of claim 15, wherein determining the CSR channel with the highest ability to connect the communication with the CSR includes accessing a current ability to connect the communication to at least one other equivalent CSR channel.

17. The non-transitory computer readable medium of claim 16, wherein determining the CSR channel with the highest ability to connect the communication with the CSR further includes comparing the current ability to connect the communication on the current CSR channel to the ability to connect the communication on the at least one other equivalent CSR channel and making the determination based on the comparing.

18. The non-transitory computer readable medium of claim 13, wherein the predetermined amount of time is calculated based on wait times or backlog.

* * * * *